Sept. 24, 1968   J. P. DOVEL   3,402,817
BALLAST OPERATED FILTER

Filed May 5, 1967   2 Sheets-Sheet 1

INVENTOR.
JAMES P. DOVEL
BY
Curtis, Morris + Safford
ATTORNEYS

INVENTOR.
JAMES P. DOVEL
BY
Curtis, Morris & Safford
ATTORNEYS

United States Patent Office 3,402,817
Patented Sept. 24, 1968

3,402,817
BALLAST OPERATED FILTER
James P. Dovel, Birmingham, Ala., assignor to Filtration Equipment Corporation, Rochester, N.Y.
Filed May 5, 1967, Ser. No. 636,411
10 Claims. (Cl. 210—80)

ABSTRACT OF THE DISCLOSURE

A filter unit, such as a confined bed of sand, through which a liquid, such as water, flows to form a pool. The filter unit has one or more pontoons to cause it to float in the pool of filtered water. The filter unit is raised by displacing water from the pontoon to produce a liquid level in the unit above the liquid level in the pool so that liquid flows downwardly through the filter bed into the pool; or lowered by releasing air from the pontoon to produce a liquid level in the unit below the liquid level in the pool to reverse the direction of flow of liquid from the pool through the filter bed for backwashing the bed.

---

The present invention relates to so-called "rapid sand" filters and more particularly to an improved method of and filter construction for filtering liquid and backwashing the filter bed.

Conventional rapid sand filters comprise a confining casing having side walls with openings in the top and bottom through which liquid may flow by gravity. A filter bed of quartz, coal or other insoluble granular material is laid in the casing which varies from very fine sand at the top to a coarse aggregate at the bottom. Liquid to be filtered, such as water, is supplied to the top of the filter unit and flows through the filter bed. As the liquid to be filtered flows between the grains of sand or other material, any solids larger than the interstices between adjacent grains becomes trapped and are filtered out of the liquid as a residue. The filtered liquid flows into a receiving well below the filter bed from which it is usually transferred to a clear well where it is stored.

After such a rapid sand filter has operated for a period of time, the filtered residue builds up to form a filter cake on the top of the bed which resists the flow of liquid therethrough. The filter is then backwashed to clean it of the residue by closing a valve in the induction line, opening a valve in an education or waste line to a sewer, and pumping a part of the filtered liquid from the receiving well through the filter bed in a reverse direction. Such a backwashing operation expands the filter bed upwardly and washes the lighter residue away from the granular material of the filter bed. The backwash water and filtered residue are then discharged through the waste line to a sewer. Backwashing is continued for the period of time required to remove substantially all of the residue from the filter bed after which the valves are reversed and a new filtering cycle is initiated.

Conventional rapid sand filters as described above usually require two separate wells, one for receiving and another for storing filtered liquid, as well as separate pumps, or elaborate reversing mechanisms, for supplying and delivering liquid to and from both the top and bottom of the filter unit.

One of the objects of the present invention is to provide a method of and apparatus for filtering liquid by which a single pool serves the double function of a receiving well for water leaving the filter unit as well as a clear well for storing filtered water.

Another object is to provide a filter unit of the type indicated which floats in a pool of filtered liquid and is backwashed by merely sinking the unit below the liquid level in the pool to cause a reverse flow of liquid through the filter bed.

Still another object of the present invention is to provide a filter unit of the type indicated which is of simple and compact construction, economical to manufacture and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

Figure 2:
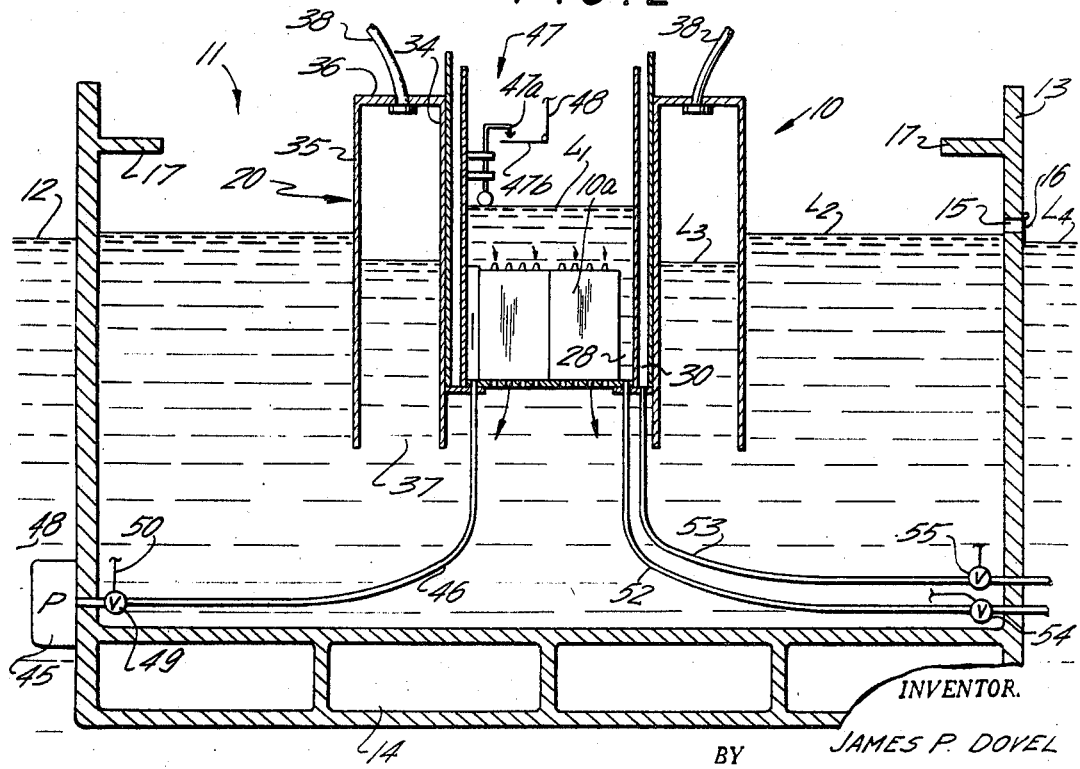
FIGURE 2 is a transverse sectional view taken on line 2—2 of FIGURE 1 showing the swimming pool floating in a natural water course and the filter unit floating in filtered water in the swimming pool constituting a clear well for the filter.
Figure 3:
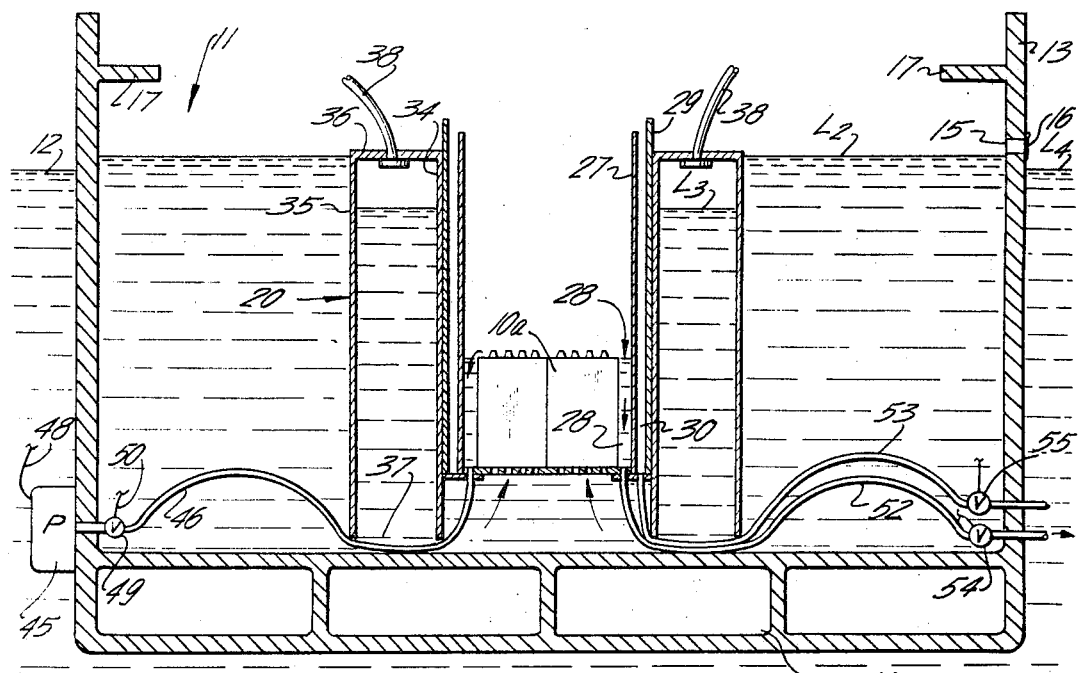
Figure 4:
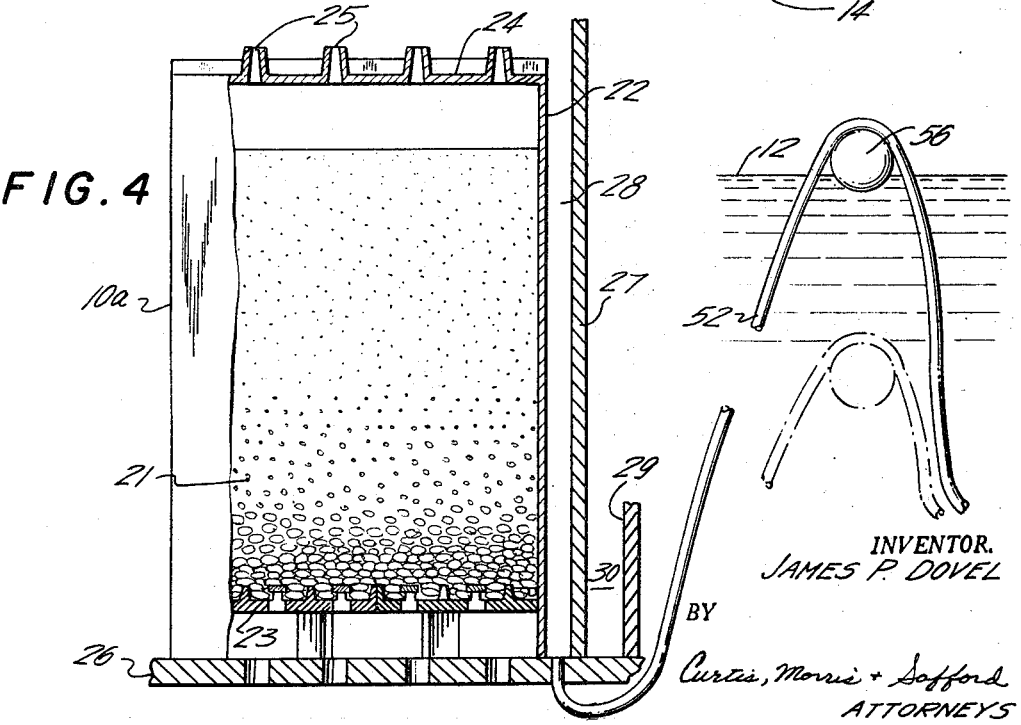

FIGURE 3 is a view similar to FIGURE 2 showing the filter unit sunk to a lower level than the liquid level in the pool to cause a reverse flow through the filter bed; and FIGURE 4 is an enlarged view of one cell of the filter unit and showing the graduation in size of the filtering material from the top to the bottom of the filter bed and a float arrangement for controlling the position of the waste line to drain backwash water and residue from the filter.

The method of the present invention comprises the steps of supplying a liquid to be filtered onto the top of a rapid sand filtering unit for flow therethrough to separate solid material, storing the filtered liquid to form a pool and floating the filter unit in the pool of filtered liquid so that the pool serves as both a receiving well and clear well. The method also includes the step of sinking the filter unit in the pool of liquid to clean the filter bed. Such sinking of the filter unit produces a reverse flow of filtered liquid through the filter bed to backwash the filtered residue therefrom. Thus, the floating of the filter unit in the pool of filtered liquid permits changing of the levels of the liquid to be filtered and filtered liquid to shift from a filtering to a backwashing operation, and vice versa.

Filtered liquid produced and stored in accordance with the method as described above may be used for any purpose such as a water supply for industrial plants or municipalities. For purposes of illustration, however, the filter unit is shown applied to a swimming pool in or adjacent a natural body of water, such as a river or lake. Thus, water from the natural body of water may be filtered and supplied to the swimming pool and water from the pool, in turn, may be used to backwash the filter floating therein.

Referring now to the drawings, a filter unit 10 is shown in a swimming pool 11 which, in turn, may float in a natural body of water 12, such as a river or lake. It will be understood, however, that the swimming pool could be constructed on the shore of a lake or river and receive water therefrom and discharge waste residue thereto.

As shown in FIGURE 2, the swimming pool 11 is in the form of a vessel 13 having a hollow bottom 14 which displaces an amount of water equal to the weight of the vessel to cause the latter to float. The floating swimming pool 11 is filled with water up to a level L2 which is controlled by overflow scuppers 15 through which water can flow from the vessel to the surrounding body of water 12. One way traps 16 may be provided in the scuppers 15 to prevent the flow of water from the body 12 into the swimming pool 11. A platform 17 extends inwardly from the walls of the swimming pool 11 around its entire periphery and it will be understood that other accessories may be provided such as diving boards, towers, steps and the like. As thus far described, the swimming pool 11 is not substantially different from floating swimming pools heretofore proposed.

In accordance with the present invention, water is supplied to the pool 11 through the filter unit 10 which is provided with a pontoon 20 to cause it to float in the pool of water forming a clear well in the vessel 13 and shown as a swimming pool in the illustrated embodiment. Water to be filtered is supplied to the filter unit 10 from the body of water 12 surrounding the vessel and residue filtered from the water may be discharged to a sewer and in some instances may be returned to the body of water 12 from which the water to be filtered was supplied.

Figure 1:
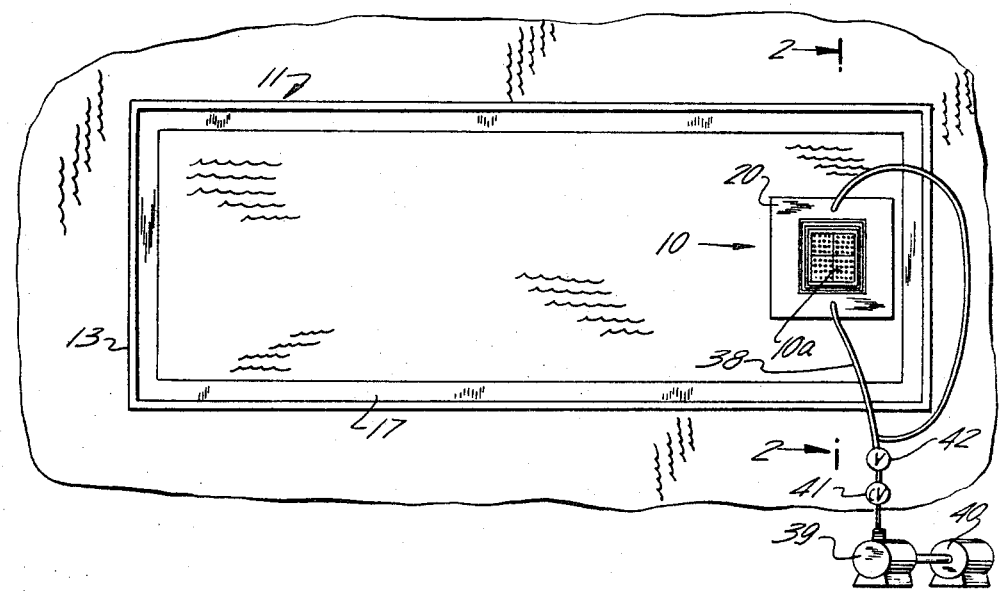
FIGURE 1 is a plan view of a swimming pool incorporating the novel filtering method and apparatus of the present invention and showing the air compressor for supplying air to a pontoon for floating a filter unit in the pool and valve means for releasing air to sink the unit for backwashing the filter bed.

Referring to FIGURES 1 and 4, the filter unit is shown as a rapid sand filter of the type described and claimed in the U.S. Letters Patent of Raymond E. Hebert No. 3,080,062, issued Mar. 5, 1963 and entitled Filters. Such a cellular type of sand filter reduces the tendency of the filter bed to shift laterally during backwashing, but it will be understood that other conventional types of filters can be used. The filter unit 10 comprises a plurality of separate cells, see FIGURE 1, one of which is shown in detail in FIGURE 4. Each filter unit cell 10a comprises a bed 21 of insoluble granular material such as sand and gravel, coal, or other forms of rock and the bed varies from a very fine sand at the top to a coarse aggregate at the bottom. The bed 21 of each cell is laid in a casing having side walls 22 and a porous platform 23. The top of each cell is closed by a cover 24 having spaced orifices 25 of a particular cross section area to control the flow of water therethrough during backwashing to prevent uneven flow through the bed in channels. The plurality of cells, in turn, are mounted in a box-like structure having a perforated bottom 26, see FIGURE 4, and side walls 27 spaced from the sides 22 of the filter unit 10 to form a gullet 28 on at least one side of each filter cell. In addition, the filter unit 10 has a safety wall 29 surrounding and spaced from the side walls 27 so that any leakage laterally through the latter from the filter unit will be collected in the annular space 30 between the walls 27 and 29 and be prevented from entering the pool.

Pontoon 20 surrounds the safety wall 29 and is attached thereto to move the filter 10 as a unit. Pontoon 20 is in the form of a rectangular box, see FIGURE 1, having inner and outer side walls 34 and 35, see FIGURE 2, and closed at the top by a wall 36 to form an air-tight closure. The bottom 37 of the pontoon 20 is open to permit water to flow in and out of the pontoon. Air is supplied to the top of the pontoon 20 through a flexible hose line 38 from a compressor 39 driven by a motor 40 and as the air is supplied to the top of the pontoon under pressure, it displaces a quantity of water in the swimming pool 11 between the levels L2 and L3, equal to the weight of the filter unit so that latter floats in the pool constituting a clear well. A check valve 41 also is provided in the line 38 to maintain the pontoon 20 in any particular position. As additional air under pressure is suplied to the pontoon 20 the filter unit rises in the pool to maintain the levels L2 and L3 and raise the filter unit 10 to position its top wall at a particular level with respect to the level L2 as, for example, one foot below the level L2. Filter unit 10 may be lowered in the pool by a bleed valve 42 for discharging air from the pontoon 20.

Water to be filtered is delivered from the body of water 12 to the pool 11 by means of a pump 45 and flexible hose line 46 connected between the pump and the gullet space 28. Water from the pump 45 rises in the box like structure surrounding the filter 10 to a level L1 above the level in the pool L2 so that it will flow by gravity through the filter unit 10 and discharge into the pool 11 constituting a clear well. Any suitable control mechanism may be provided for regulating the operation of the pump 45 to supply water to be filtered and for purposes of illustration a float operated switch 47 is shown having a contact 47a and 47b for completing a circuit through a conductor 48 to the pump 45. The line 46 also includes a valve 49 which is open during a filtering operation and closed during a backwash operation. Valve 49 is shown diagrammatically as operated by an electrical conductor 50 which may be manually controlled to start either a filtering operation or a backwash operation.

Flexible hose lines 52 and 53 connect the gullet 28 and annular space 30 between the gullet wall 27 and safety wall 29, respectively, to a sewer or other disposal area at a lower level than the level L4 of the surrounding body of water 12. Line 52 has a valve 54 which may be manually operated to control the backwashing operation. Line 53 also has a valve 55 which is normally open to drain any water which may have leaked laterally from the filter unit. One form of the invention now having been described in detail, the mode of operation is next explained.

Assuming for purposes of description that the vessel 13 is empty and is floating at a high level in the body of water 12. A filtering operation is initiated by closing valve 54 in drain line 52 and starting operation of the pump 45. Pump 45 then delivers water from the body of water 12 through the flexible hose line 46 to the gullet space 28. With the valve 54 closed, the water rises in the filter unit to a level L1 and flows through the orifices 25 onto the top of the filter bed 21 and then through the bed and perforated platform 23 and bottom wall 26 into the interior of the vessel 13. This filtered water then accumulates in the vessel 13 constituting a clear well and enters the open bottom of the pontoon 20. As water enters the pontoon 20, it compresses the air therein to produce a difference in pressure acting on the water in the pontoon and in the vessel. When a difference in the liquid levels L2 and L3 displaces an amount of water equal to the weight of the filter unit 10, the latter will float in the clear well in the manner shown in FIGURE 2 and the flexible hose lines 46, 52 and 53 permitting such movement. Such a filtering operation continues until the liquid level L2 in the vessel 12 reaches the scupper 15 at which time clear water will tend to overflow back into the body of water 12. During such a rise in the liquid level air may be added to the pontoon 20 by compressor 39 or discharged therefrom by means of the bleed valve 42 until the filter unit 10 is at a desired level in the vessel 13 where liquid level L1 in the filter unit will cause water to flow through the filter bed 21 and produce a level L2 in the vessel up to or slightly below the scuppers 15. Such a filtering operation is controlled by the float operating switch 47 which controls the pump 45.

As the filtering operation continues the residue of solid material filtered from the water forms a cake on the top of the filter bed 21 which resists the flow of water therethrough so that a progressively higher difference in levels L1 and L2 is necessary to produce the same flow through the filter 10. When the resistance to flow reaches a particular value, a backwash operation is initiated. To backwash the filter bed 21, the pump 45 is stopped, the valve 49 closed and the valve 54 opened. In addition, the valve 42 in the air line 38 is opened to permit the escape of air from the pontoon 20 which causes the filter unit 10 to sink from the level illustrated in FIGURE 2 to that illustrated in FIGURE 3. The liquid level L2 in the vessel 13 is then considerably higher than the top of the filter unit 10 which causes water to flow in a reverse direction from the clear well constituting the swimming pool 11 through the filter bed 21. Such flow of backwash water expands the filter bed 21 and washes the residue from the top layer of the bed and discharges it through the orifices 25 in the cover 24. The slurry of wash water and residue then flows into the gullet 28 and through the line 52 into a sewer or the like. If the swimming pool 11 is located above the level L4 of the body of water 12, the slurry of wash water and filter residue may be returned to the body of water. The orifices 25 in cover 24 of filter cells 10a restrict the flow to maintain a uniform flow throughout the entire area of the filter bed 21 as explained in the Hebert Patent No. 3,080,062 referred to above. This backwashing operation continues for a predetermined period of time necessary to clean the filter as determined from previous experience. After the filter has been completely backwashed, the drain valve 54 is closed, the induction valve 49 is opened and the operation of the pump 45 is initiated to start a new filtering operation.

FIGURE 4 also shows a modified arrangement for controlling a backwashing operation in place of the valve 54. In this arrangement, the flexible line 52 is maintained at a higher level than the level L1 in the clear well pool 11, see FIGURE 2, by a float 56. By sinking the float 56 the line 52 also sinks to permit flow from the gullet 28.

It will now be observed that the present invention provides an improved method of and apparatus for filtering liquid in which a single pool serves the double function of a receiving well and clear well for storing filtered water. It will also be observed that the present invention provides a filter unit that may be backwashed by sinking a floating filter unit below the liquid level in the pool to cause a reverse flow of the liquid through the filter bed. It will still further be observed that the present invention provides a filter unit which is of simple and compact construction, economical to manufacture and one which is reliable in operation.

While a single embodiment of the invention and modified control arrangement is herein illustrated and described, it will be understood that changes may be made in the steps of the method and in the construction and arrangement of elements without departing from the spirit or scope of the invention. Therefore, without limitation in this respect, the invention is defined by the following claims.

In the claims:

1. A method of filtering liquid which comprises the steps of delivering liquid onto the top of a filter unit for passage through a bed of filtering material by gravity, storing filtered liquid to form a pool, floating said filter unit in said pool, cleaning the filter unit by sinking it in the pool to cause filtered liquid to flow from said pool through said bed to backwash filtered residue from the filter bed, and draining said backwash liquid and filtered residue from the filter unit.

2. In a filter of the type in which a liquid to be filtered flows through a bed of filtering medium and separates solid material to form a cake of residue on the top of the bed which is intermittently removed by backwashing, that improvement which comprises a structure forming a clear well pool of filtered liquid, a pontoon for floating the filter bed in the clear well pool, means for sinking the pontoon to cause filtered liquid to flow from the clear well pool upwardly through the filter bed, and an outlet from the filter bed for discharging backwash liquid and residue from the filter.

3. A filter comprising a vessel for receiving water and forming a clear well, a filter unit in said vessel and having a bed of filtering medium therein, means including an induction line for delivering water to said filtering unit for flow through the bed of filtering material to form a pool of filtered water in said vessel, a pontoon connected to said filter unit to float it in the pool of filtered liquid, means for at least partially flooding the pontoon to sink the filter unit in the pool to a level at which filtered water will flow from the pool in a reverse direction to backwash the filter bed, and an outlet means including an eduction line from the filter unit to discharge water and residue therefrom.

4. A filter in accordance with claim 3 in which the filter unit is a bed of sand and aggregate of progressively increasing size from the top to the bottom of the bed.

5. A filter in accordance with claim 3 in which the means for delivering water is a pump and line connecting said pump to the filter unit, the outlet from the filter is a discharge line, said lines extending through the clear well and being flexible to adapt the filter unit to rise and fall in the pool, and valves in said lines for delivering water to and from said filter unit.

6. A filter in accordance with claim 3 in which the pontoon surrounds said filter unit, means for supplying air to said pontoon to displace water therefrom and cause it to float in said pool, and a valve for bleeding air from said pontoon whereby to raise and lower said filter unit in said pool.

7. A filter in accordance with claim 3 in which the clear well pool is formed by a floating structure in a body of water, and the water to be filtered is pumped from said body of water.

8. A filter in accordance with claim 7 in which the structure floating in said body of water is a swimming pool, said filter supplying clean water from said body of water to said pool, and said outlet delivering water and residue from the filter to a location outside said floating structure.

9. A filter in accordance with claim 3 in which the filter unit comprises an inclosure having side walls, a filter bed in said inclosure, a wall surrounding the filter unit to form a gullet therebetween, said induction and eduction lines being connected to said gullet, a safety wall surrounding the gullet wall of the filter unit to drain any water leaking from the filter unit, and a flexible discharge line connected to the space between the gullet and safety walls.

10. A filter in accordance with claim 9 in which the eduction line from said gullet is flexible, and a submersible float in said pool of filtered water for supporting a loop of said eduction line at a level above the liquid level in said filter unit.

References Cited

UNITED STATES PATENTS

| | | | |
|---|---|---|---|
| 763,325 | 6/1904 | Roche | 210—242 |
| 3,080,062 | 3/1963 | Hebert | 210—275 |

SAMIH N. ZAHARNA, *Primary Examiner.*